United States Patent [19]

Milling et al.

[11] 3,981,144
[45] Sept. 21, 1976

[54] DUAL STAGE SUPERSONIC DIFFUSER
[75] Inventors: Robert W. Milling; Hans J. P. Von Ohain, both of Dayton, Ohio
[73] Assignee: The United States of America as represented by the Secretary of the Air Force, Washington, D.C.
[22] Filed: Oct. 28, 1975
[21] Appl. No.: 626,147

[52] U.S. Cl. .............................. 60/270 R; 73/147
[51] Int. Cl.² .................. G01M 9/00; F02K 7/10
[58] Field of Search ............... 60/270 R, 270 S; 73/147; 137/15.1, 15.2; 138/39; 415/181

[56] References Cited
UNITED STATES PATENTS
2,678,560  5/1954  Bonney .............................. 73/147
2,696,110  12/1954  Eggers .............................. 73/147
2,841,952  7/1958  Billman ........................... 60/270 R

Primary Examiner—Carlton R. Croyle
Assistant Examiner—L. J. Casaregola
Attorney, Agent, or Firm—Joseph E. Rusz; Richard J. Killoren

[57] ABSTRACT

A diffuser having a dual-stage configuration with the diffusing element of the first stage aligned perpendicularly to the second stage. The diffuser vanes of the first stage are inclined at an angle to the direction of flow so that the flow field between the first stage and the second stage changes from the conditions before diffuser starting to the conditions after diffuser starting to produce an effect similar to the change in flow cross section of a variable throat area diffuser. The second stage of the diffuser has its wall configured similar to the contour of a two dimensional ramjet inlet diffuser.

8 Claims, 14 Drawing Figures

Fig-6

DUAL STAGE SUPERSONIC DIFFUSER

RIGHTS OF THE GOVERNMENT

The invention described herein may be manufactured and used by or for the Government of the United States for all governmental purposes without the payment of any royalty.

BACKGROUND OF THE INVENTION

State of the art diffusers can be classified in two major groups, namely, constant and variable throat diffusers. Constant throat diffusers are characterized by mechanical simplicity and low cost, but poor performance at high supersonic Mach numbers; their total pressure recovery is in general somewhat less than that of a straight shock which is, for example, at Mach 5 and about 6%. The diffusers with variable throat geometry are capable of much higher pressure recoveries, 20 to 30% at Mach 5; however, complexity and cost of such diffusers are very high. With the variable throat diffuser such means as actuators and sensors are needed to vary the throat geometry, which results in a comparatively slow overall response time.

BRIEF SUMMARY OF THE INVENTION

According to this invention, a dual-stage diffuser configuration is provided wherein the diffusing elements of the first and second diffuser stages are aligned perpendicularly to each other. The diffuser throat of the first stage is inclined at an angle to the direction of flow. The second stage is a contoured diffuser similar to the inlet diffuser of a supersonic ramjet. The change in flow field geometry between the two stages has an effect similar to the change in the flow cross section of a variable throat area diffuser. However, in the dual-stage diffuser according to this invention, the change in the flow field geometry occurs automatically and instantaneously after starting of the first diffuser stage.

IN THE DRAWINGS

FIG. 3 is a schematic diagram showing the unstarted first diffuser stage conditions for the device of FIG. 1.

FIG. 8 is a schematic illustration showing the device of FIG. 1 modified for ramjet operation.

FIG. 9 is a schematic illustration showing a symmetrical system for use with a ramjet.

DETAILED DESCRIPTION OF THE INVENTION

Figure 1:
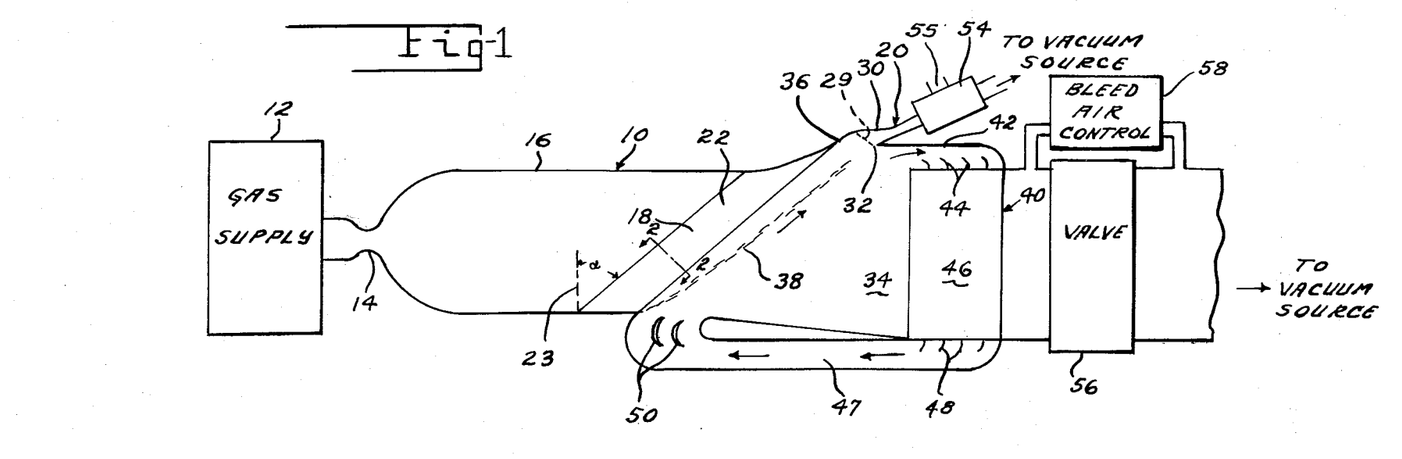
FIG. 1 is a schematic view of a wind tunnel using the dual-stage diffuser of the invention.
Figure 2:
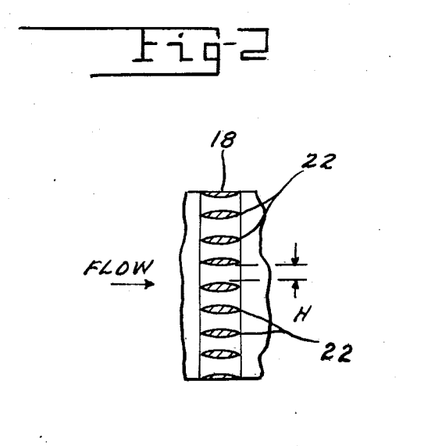
FIG. 2 is a sectional view of first diffuser stage vanes along the line 2—2 of FIG. 1.

Reference is now made to FIG. 1 of the drawing which shows a wind tunnel 10 having a gas supply 12, an expansion nozzle 14, a test section 16 and a two stage diffuser having a first stage 18 and a second stage 20. The first and second stages are aligned perpendicularly to each other.

The first diffuser stage has vanes 22, that are inclined at an angle $\alpha$ with respect to a line 23 normal to the flow.

The operation of the first stage will be described with respect to FIGS. 3 and 4.

Immediately prior to starting of the first diffuser stage a shock front 24 is traveling through the test section, as shown in FIG. 3; the air flowing through the test section has a high supersonic Mach number, for example $M_s=5$. The Mach number $M_2$, and the approach velocity $V_a$ to the first diffuser stage are subsonic with $M_2$ approximately equal to 0.415. The velocity components normal and parallel to the inclined diffuser vanes $V_{a(n)}$ and $V_{a(p)}$, respectively and their corresponding Mach numbers are as follows:

$$V_{a(n)} = V_a \cos\alpha; \quad V_{a(p)} = V_a \sin\alpha \qquad (1)$$

$$M_{a(n)} = M_2 \cos\alpha; \quad M_{a(p)} = M_2 \sin\alpha \qquad (2)$$

The parallel velocity component $V_{a(p)}$ remains essentially unchanged from station $(a)$ to station $(c)$, while the normal velocity component $V_{a(n)}$ increases to a maximum value $V_{b(n)}$ at the blade passage throat station $(b)$. For the starting of the first diffuser stage, it is necessary that the normal velocity component $V_{b(n)}$ at the diffuser throat be below sonic speed. This condition results in the following relationships:

$$H = H (\alpha = 0) \cdot \cos\alpha \qquad (3)$$

where $H (\alpha = 0)$ represents the throat height for the limiting case when the inclination angle $\alpha$ approaches zero. The significance of equation (3) lies in the starting capability of the fixed geometry first diffuser stage in which the throat height (H) is substantially smaller (by the factor "$\cos\alpha$") than that of a corresponding non-inclined diffuser.

The streamlines through the first diffuser stage immediately before diffuser starting, line $(e)$ are determined by the change in blade passage between stations $(a)$ and $(c)$. This change in flow cross section causes a change of the normal velocity component $V_{(n)}$ while the parallel velocity component $V_{(p)}$ remains essentially constant. Normally, the endwall contour would be shaped like the streamlines, dotted lines 25, when blade aspect ratio or endwall effects are to be avoided; otherwise, the throat height H should be increased in order to avoid choking.

After diffuser starting, which will be described with respect to FIG. 4, the two velocity components $V_{a(n)}$ and $V_{a(p)}$ of the supersonic approach velocity follow the same relationship as given by equation (1). The corresponding Mach numbers are as follows:

$$M_{a(n)} = M_s \cos\alpha$$

and $$M_{a(p)} = M_s \sin\alpha \qquad (4)$$

In contrast to the subsonic case, the normal velocity component $V_{a(n)}$ is being decelerated immediately from the diffuser entrance ($a$) to the exit ($c$). At exit station ($c$) the normal velocity component $V_{c(n)}$ is subsonic, and the static temperature $T_{1(c)}$ and static pressure $P_{1(c)}$ are substantially increased above the corresponding values at diffuser entrance, station ($a$). The velocity component $V_{(p)}$ parallel to the first stage diffuser vanes remains nearly constant from station ($a$) to station ($c$) except for a small speed reduction due to skin friction.

Figure 4:
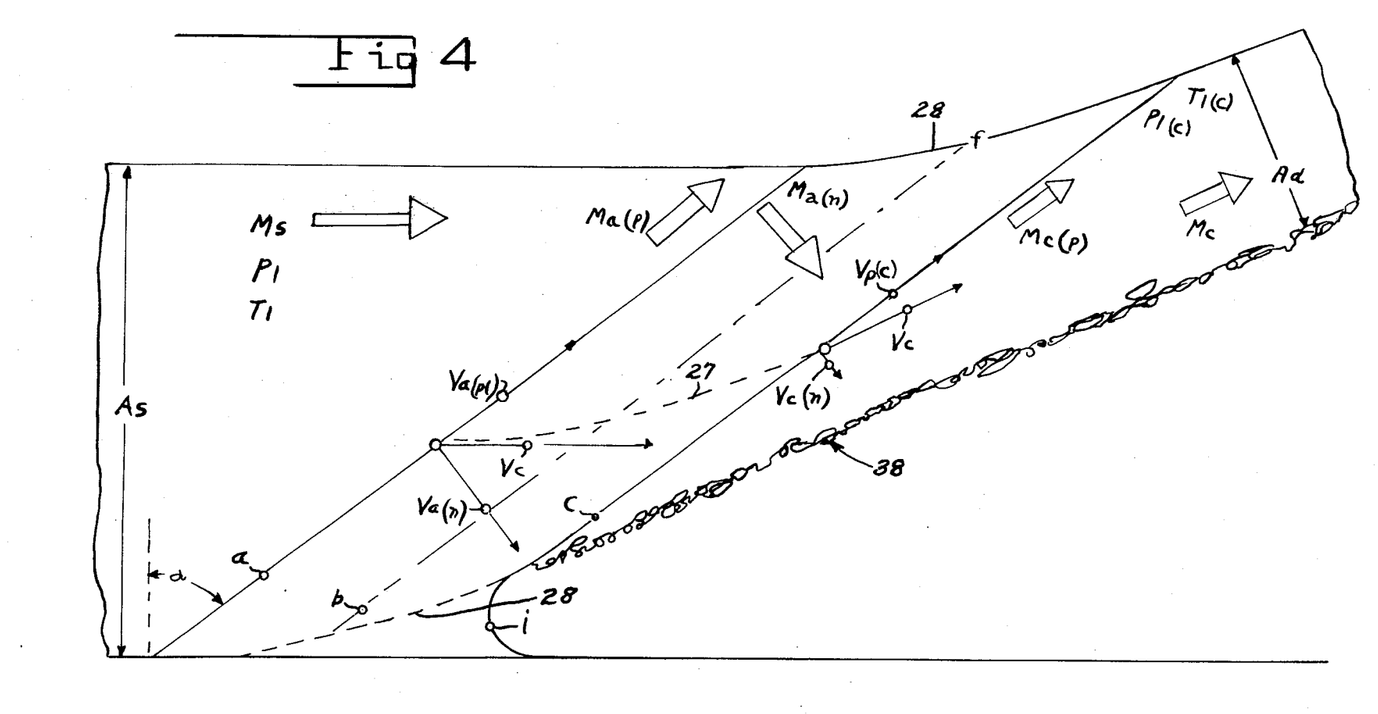
FIG. 4 is a schematic diagram showing the started first diffuser stage conditions for the device of FIG. 1.
Figure 5:
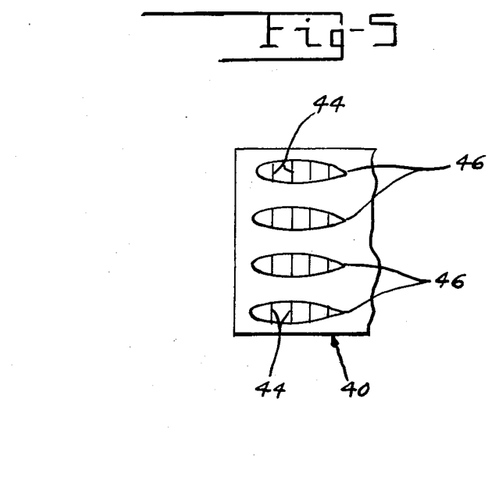
FIG. 5 is a sectional view of the device of FIG. 1 along the line 5—5.

The general shape of the stream lines can be determined from the above velocity considerations as indicated by line 27 (FIG. 4). However, the streamlines for the started and unstarted cases differ considerable from each other as a comparison between FIGS. 3 and 4 indicates. The best results would be achieved when the endwalls 28 are shaped to fit the supersonic flow pattern.

While the parallel velocity component $V_{(p)}$ is nearly constant from station ($a$) to station ($c$) (FIG. 3), the corresponding Mach number $M_{(p)}$ decreases from station ($a$) to station ($c$) due to the previously mentioned temperature increase:

$$M_{c(p)} = M_{a(p)} \; \frac{V_{c(p)}}{V_{a(p)}} [T_1/T_{1(c)}]^{1/2} \qquad (5)$$

where $$\frac{V_{c(p)}}{V_{a(p)}}$$

is slightly smaller than unity because of skin friction losses as stated previously.

The flow conditions downstream from the first diffuser stage can be determined as follows: The exit velocity $V_c$ at station ($c$) (FIG. 4) is the sum of the two components $V_{c(n)}$ and $V_{c(p)}$. Consequently, the gas leaving the first diffuser stage is forming a free stream with the free stream interface indicated by 38. The flow cross section of the free stream $A_d$ is much smaller than that of the test section $A_s$ (for $M_s = 5$ : $A_d/A_s$ approximately equal to 1/10). This decrease in flow cross section after starting of the first diffuser stage is consistent with the increase in mass flow per flow cross section (density X velocity) from the test section to the exit of the first diffuser stage. The corresponding change of the flow field geometry between both stages has an effect similar to the change in flow cross section of a variable throat area diffuser.

The angle $\alpha$ should be selected to provide optimum pressure recovery for the two stages. To obtain optimum pressure recovery, the Mach number leaving the first stage should be equal to the normal component of the first stage entering Mach number.

That is:

$$M_{a(n)} = M_{c(p)} \qquad (6)$$

Then from equations 4 and 5:

$$M_s \cdot \cos\alpha = M_s \sin\alpha \cdot \frac{V_{c(p)}}{V_{a(p)}} [T_1/T_{1(c)}]^{1/2} \qquad (7)$$

Neglecting the small effect due to skin friction, this then becomes:

$$\cos\alpha = \sin\alpha \, [T_1/T_{1(c)}]^{1/2} \qquad (8)$$

The temperature rise, $T_1/T_{1(c)}$, is given by the isentropic temperature relation:

$$T/T_0 = (1 + \frac{\gamma - 1}{2} M^2)^{-1} \qquad (9)$$

when the Mach number is taken as the normal component of the first stage entrance Mach number, $M_{a(n)}$. Hence:

$$\cos\alpha = \sin\alpha \, [1 + \frac{\gamma - 1}{2} M_s^2 \cos^2\alpha]^{-1/2} \qquad (10)$$

From this expression, the optimum angle $\alpha$ can easily be determined by trial and error methods in a computer. For the device as described, with $M_s = 5$ and $\gamma = 1.4$ the angle $\alpha$ is between 57° and 58°.

The second diffuser stage may be very similar in structure and function to an inlet diffuser of a supersonic ramjet. The line 29 and subsequent wall 30 (FIG. 1) correspond to the leading edge and contour of a two-dimensional ramjet centerbody. From the line 29 and following wall 30 in an oblique shock or system of shocks is generated which extends to the inlet lip 32. Prior to starting of the second diffuser stage, a portion of the gas can spill over from the lip 32 into the exhaust duct 34 (FIG. 1). The approach Mach number to the second diffuser stage equals the Mach number of the flow leaving the first diffuser stage, which in very good approximation is equal to $M_{c(p)}$, see FIG. 4 and equation (5). A typical value for the approach Mach number to the second diffuser stage is approximately 2.5 based on a test section Mach number $M_s$ equal to 5. With respect to interactions between first and second stage, it is important to note that started or unstarted conditions of the second diffuser stage have no feedback effect upon the starting characteristics of the first diffuser stage. This condition requires, however, that there is at least a small distance between line 29 (FIG. 1) and the adjacent tips 36 of the diffuser vanes of the first diffuser stage.

It may seen that considerable mixing losses could occur at the free stream interface 38 (FIG. 4). Such losses can be reduced substantially by means which generate a recirculatory flow pattern in essentially stagnant gas contained in duct 34 and the exhaust duct configuration as shown at 40, in FIG. 1.

The gas in duct 34 at the interface 38 flows past lip 32 into a channel 42 then through flow vanes 44 to a channel 47 and past guide vanes 48 and 50 and then back along the interface 38. Guide vanes 44 and 48 are provided at the entrance and exit of the flow vanes 46.

The exhaust duct 34 (FIG. 1) plays an important functional role in the dual-stage diffuser. The conditions in the test section (static pressure $P_1$, static temperature $T_1$, and Mach number $M_s$) are determined by the geometry of the expansion nozzle and the gas conditions prior to expansion. By these conditions and the geometry of the first diffuser stage, the highest attainable static pressure $P_{1(c)}$ can be determined. To enable starting of the first diffuser stage, it is necessary that the pressure in the exhaust duct 34 be sufficiently lower than $P_{1(c)}$. After starting of the first diffuser stage, the static pressure in the exhaust duct must be increased nearly to the value of $P_{1(c)}$.

In a wind tunnel, the ambient pressure is higher than $P_{1(c)}$; in fact, the ambient pressure is as high as the exit pressure of the second diffuser stage. In order to achieve starting, both the exhaust duct 34 and the exit of the second diffuser stage must be connected with a vacuum sphere through valve means, as shown at 54 and 56. Immediately after starting, the valve 56 between duct 34 and the vacuum sphere is closed except for a small pressure control passage and a bleed air control 58 while the second diffuser stage 20 is completely disconnected from the vacuum sphere and is opened to the ambient atmosphere through duct 55 by means of valve 54. The bleed control keeps the pressure in duct 34 below $P_{1(c)}$ to prevent unstarting of the first stage. In this way, only a very small fraction of the total wind tunnel air is discharged into the vacuum sphere. Thus, for large installations, maintenance and capital cost of evacuation equipment and vacuum spheres are significantly reduced.

The basic configuration of the dual-stage diffuser shown in FIG. 1 is an unsymmetrical structure due to the inclined first stage. Without changing any of the basic functions of the dual-stage diffuser, it is possible to achieve structural symmetry as illustrated schematically in FIGS. 6 and 7. The symmetrical configurations have the advantage of a shorter length in comparison with the unsymmetrical structure shown in FIG. 1.

Figure 6:
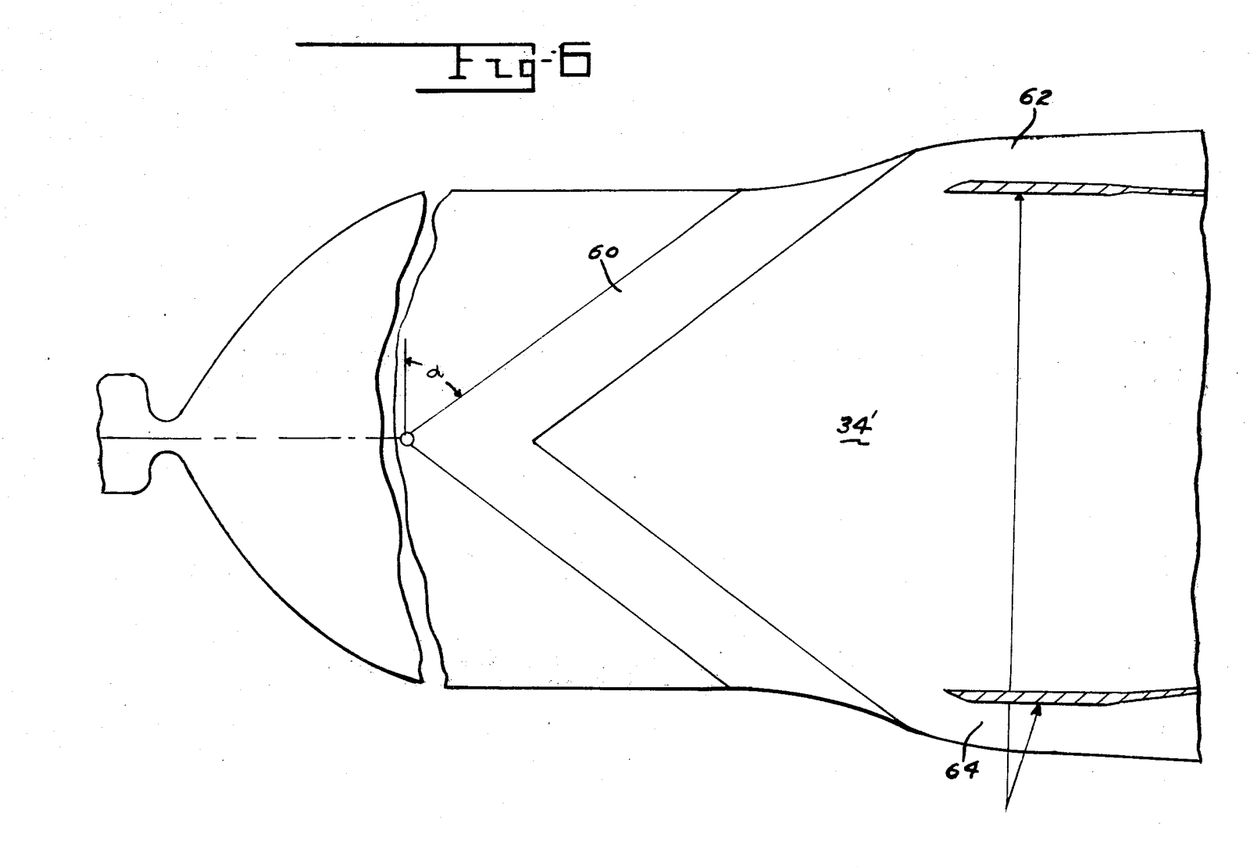
FIG. 6 is a schematic illustration showing one type of symmetrical system using the dual stage diffuser of FIG. 1.

The device in FIG. 6 is similar to that shown in FIG. 1 with a V-shaped vane 60 for the first diffuser stage. Two second diffuser stages 62 and 64 are provided downstream of the first diffuser stage. Duct 34' will be substantially the same as in FIG. 1.

Figure 7:
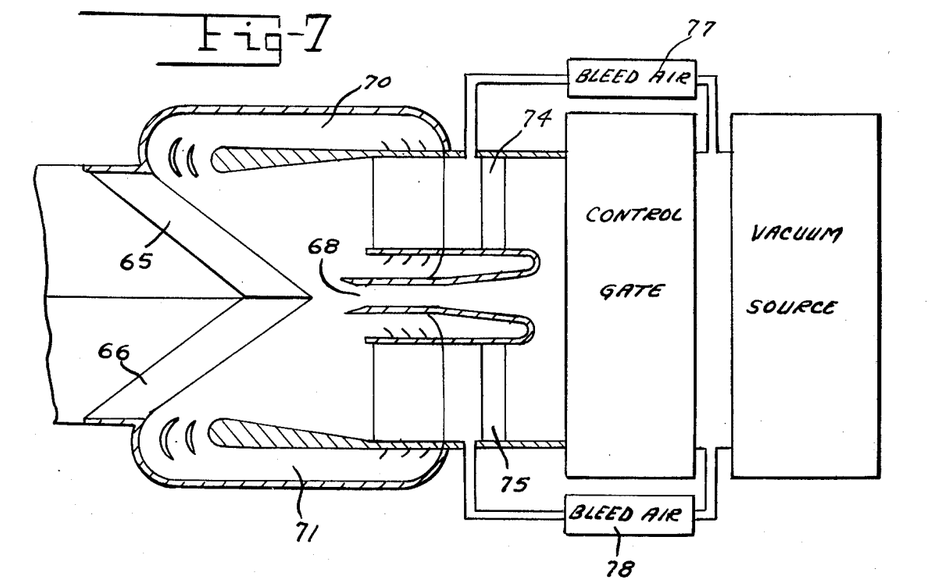
FIG. 7 is a schematic diagram of a modification of the device of FIG. 6.

A more compact dual stage diffuser is shown in FIG. 7. In this device, the two side portions 65 and 66 of the first diffuser stage supply air to a single second stage diffuser 68. A pair of recirculating flow paths 70 and 71 are provided in this device. Also, a pair of valve elements 74 and 75 with bleed air controls 77 and 78 are provided, corresponding to valve 56 and bleed control 58 in FIG. 1.

Figures 10, 11:
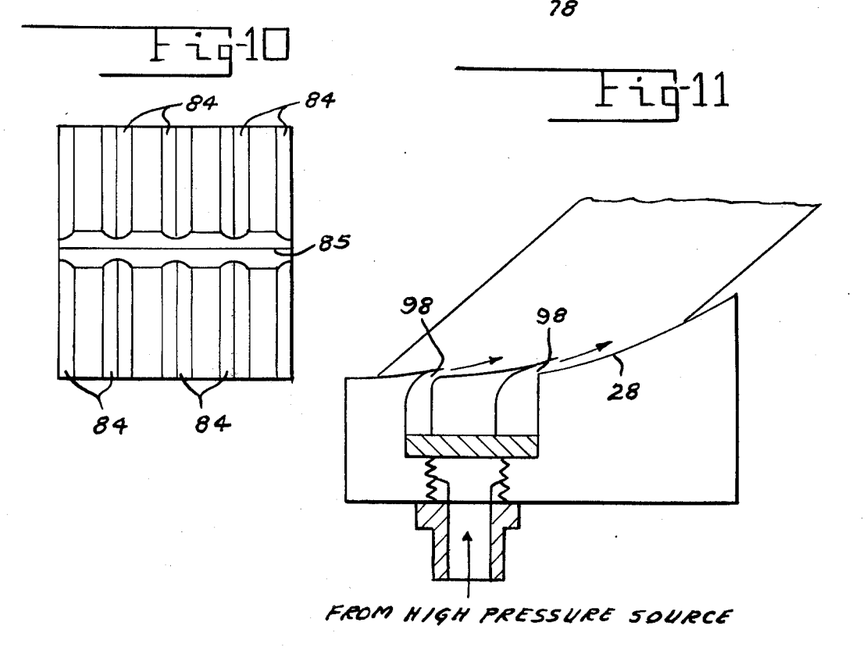
FIG. 10 is a schematic left end view of the device of FIG. 9.
FIG. 11 shows a conventional system for providing end wall boundary layer energization for the first diffuser stage for the device of FIG. 1.
Figure 10:
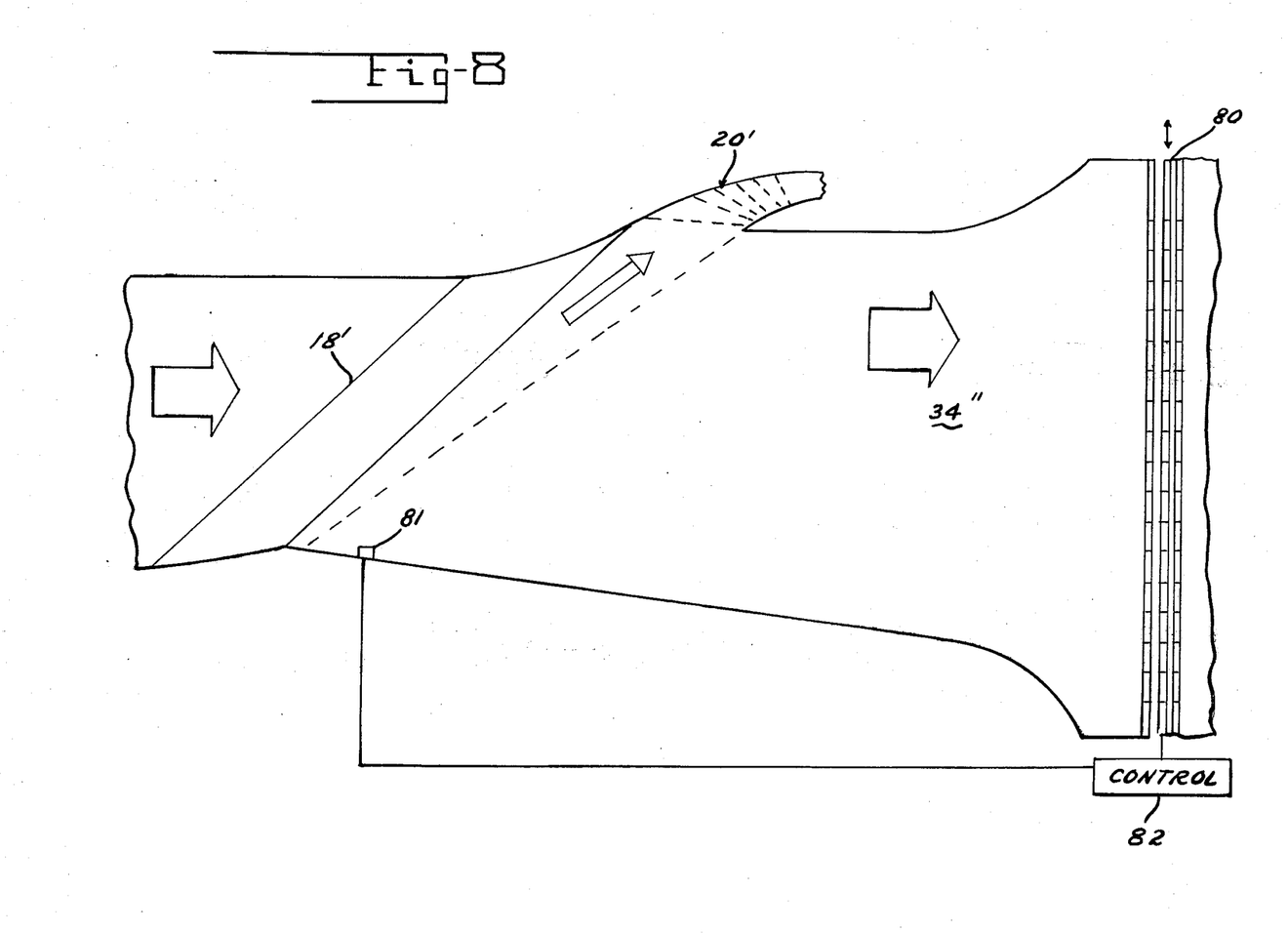

The dual stage diffuser of FIG. 1 can be modified for use with a ramjet as shown in FIGS. 8, 9 and 10.

In the ramjet case the ambient pressure is below the static pressure $P_{1(c)}$ in the diffuser. After starting of the first diffuser stage 18', the exhaust duct 34" can be throttled by valve means 80 as schematically illustrated in FIG. 8. The movement of valve means 80 is controlled by sensor 81 and control 82. Thereby the static pressure in the exhaust duct 34" increases and can be held constant at a pressure level of $P_{1(c)}$. In order to insure stable operation and to prevent unstarting of the first diffuser stage by small pressure fluctuations, the pressure in the exhaust duct should be held at a level slightly below $P_{1(c)}$. The air leaving the first diffuser stage is further compressed by the second stage 20' and ducted into a combustor (not shown in FIG. 8). The combustion gas is normally expanded through a supersonic thrust nozzle having a throat which is substantially larger than the throat of the second diffuser stage as a result of the high temperature of the combustion gas.

A symmetrical configuration for a ramjet using the diffuser of the invention is shown in FIGS. 9 and 10. The first stage of the diffuser 83 has a plurality of vane members 84 positioned on opposite sides of a center body 85 as shown in FIG. 10. The flow from the first stage after starting is directed into the second diffuser stage 86, as in FIG. 7, and then into the combustor 87. The combustion gas is expanded through a supersonic thrust nozzle 89 in a conventional manner. Duct 34''' corresponding to duct 34" in FIG. 8 has doors 91 which will be in their open position before starting, as shown at 93 in FIG. 9 and in the closed position after starting of the first diffuser as shown at 94 in FIG 9. Sensors 81' and controls 82' open and close doors 91 as a function of the pressure at the output of the first diffuser stage. The device of FIGS. 9 and 10 could also be made with radial vanes in the first diffuser stage, with the second diffuser stage being made to receive the flow from the radial vanes.

For the prevention of flow separation, boundary layer control means are required in view of the steep pressure rise in both diffuser stages. Depending on the diffuser application, a variety of boundary layer control means may be applicable.

Figure 12:
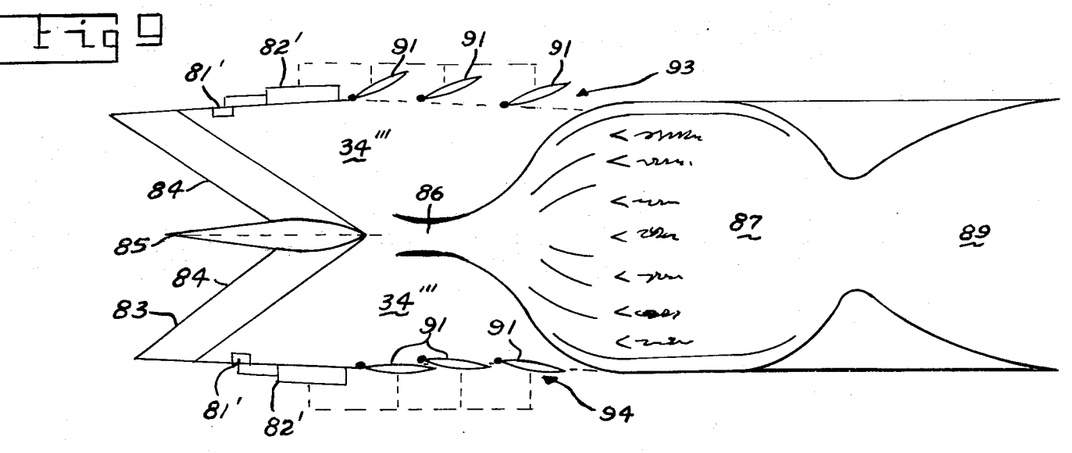
FIG. 12 shows a conventional system for providing boundary layer energization for the vanes for the first diffuser stage for the device of FIG. 1.

In the case wherein the ambient pressure is higher than in the first diffuser stage, as in a wind tunnel, boundary layer energization wherein high pressure air is supplied to nozzles 98 in wall 28, as in FIG. 11. Gas may also be supplied to exit slots 99 in the vanes 22' of the first diffuser stage as shown in FIG. 12.

Figure 13:
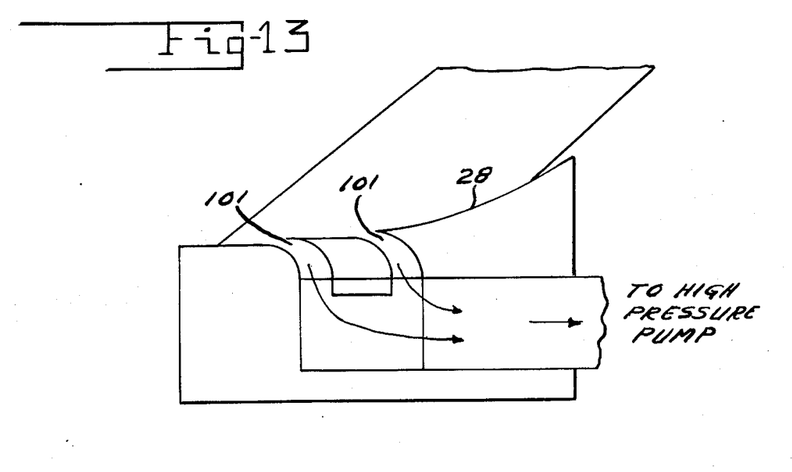
FIG. 13 shows a conventional system for providing end wall boundary layer bleeding for the first diffuser stage for the device of FIGS. 8 and 9.
Figure 14:
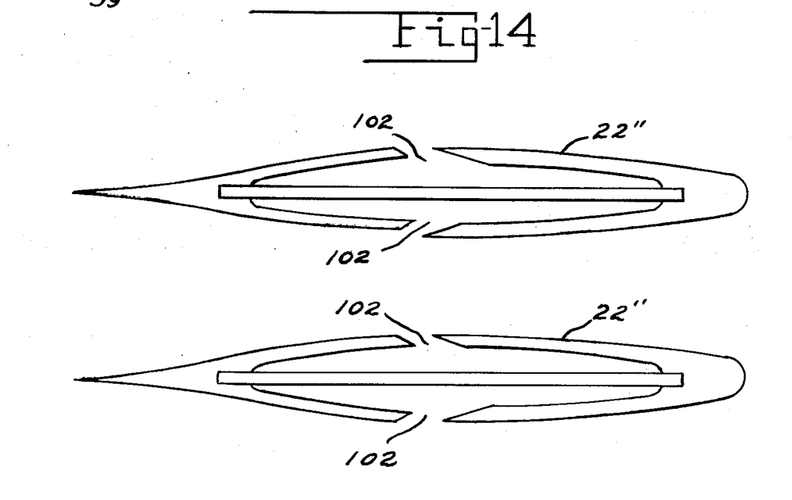
FIG. 14 shows a conventional system for providing boundary layer bleeding for the vanes for the first diffuser stage for the device of FIGS. 8 and 9.

When the ambient pressure is lower than the static pressure in the first diffuser stage, as in ramjets, boundary layer bleeding may be provided to nozzles 101 for the end walls 28, as shown in FIG. 13, and to the slots 102 in vanes 22", as shown in FIG 14.

While a plurality of vanes are shown in the first diffuser stage, for some applications vanes may not be used, but a single throat may be provided between V-shaped raised portions in the diffuser walls.

Also for some applications the exhaust duct may not be needed, for example, in a supersonically launched ramjet powered missile.

There is thus provided a diffuser system wherein the starting time is much shorter than in prior art devices and which produce effects equivalent to a variable throat area diffuser without the complexity of variable throat diffusers.

We claim:

1. A two stage supersonic diffuser, comprising: a gas flow passage; means for providing a supersonic gas flow through said passage; means for providing a first diffuser stage within said passage; said first diffuser stage including means for providing at least one diffuser throat inclined at a predetermined angle with respect to the direction of gas flow through the passage, to thereby form a free stream, at the output of the first diffuser stage, flowing at a predetermined angle with respect to the direction of flow upstream of the first diffuser stage; a second diffuser stage in gas receiving relation to the flow in said free stream; said second diffuser having its inlet spaced from the output of the first diffuser stage and having a diffuser throat approximately perpendicular to the diffuser throat of the first diffuser stage.

2. The device as recited in claim 1 having an exhaust duct down stream of said first diffuser stage; means for providing a recirculation gas flow path for boundary layer gas between the gas in said free stream and the gas in said exhaust duct.

3. The device as recited in claim 1 wherein said first diffuser stage includes a plurality of V-shaped vanes forming V-shaped diffuser throats with the apex of the vanes being directed upstream of the flow to thereby form two free streams directed toward opposite sides of the gas flow passage and having two second diffuser stages with one of the second diffuser stages being positioned in gas flow receiving relation to each of said free streams.

4. The device as recited in claim 1 wherein said first diffuser stage includes a plurality of V-shaped vanes forming V-shaped diffuser throat with the apex of the vanes being directed downstream of the flow to thereby form two free streams directed toward the center of the flow passage and wherein a single second diffuser stage is positioned in gas flow receiving relation to both of said free streams.

5. The device as recited in claim 2 including a test section upstream of said first diffuser stage; said means for providing a supersonic gas flow through the passage including a high pressure gas source and a supersonic expansion nozzle upstream of said test section and connected to said high pressure gas source; means for maintaining a low pressure downstream of said first diffuser stage and said second diffuser stage; means for disengaging said low pressure maintaining means from said first diffuser stage and the second diffuser stage after diffuser starting.

6. The device as recited in claim 5 including means for providing boundary energization to the end walls and vane walls of said first diffuser stage.

7. The device as recited in claim 1 including a ramjet combustor connected to the output of said second diffuser stage; a thrust nozzle connected to said ramjet combustor; said supersonic gas flow through said passage being supplied by ram air at the inlet to said first diffuser stage.

8. The device as recited in claim 7 including means for removing boundary layer air from the end walls and vane walls in the first diffuser stage.

* * * * *